J. J. LOWDEN.
Stove-Lid.
No. 225,151.   Patented Mar. 2, 1880.
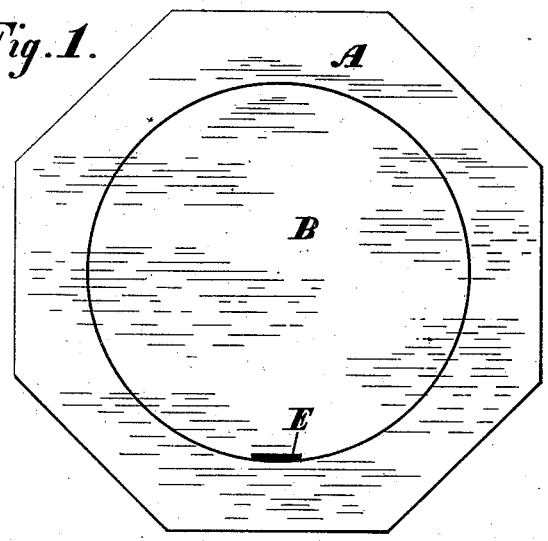
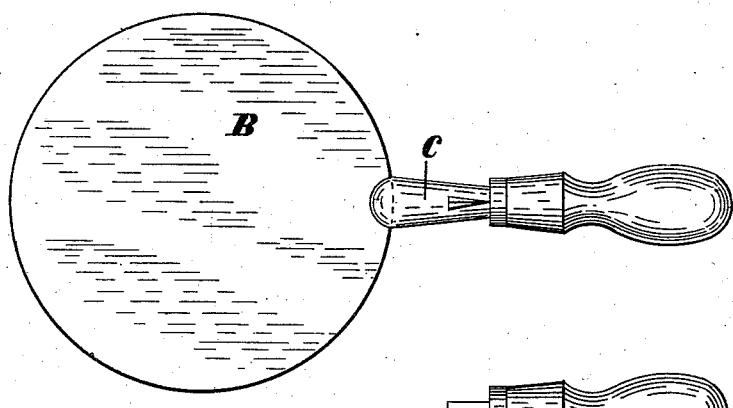
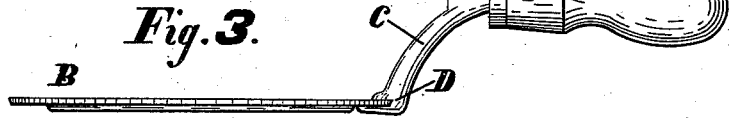
Witnesses:
D F Spencer
Edward Russell
Inventor:
James J. Lowden

United States Patent Office.

JAMES J. LOWDEN, OF HOOSICK FALLS, NEW YORK, ASSIGNOR OF ONE-HALF OF HIS RIGHT TO ARCHIBALD ALEXANDER SCHENCK, OF SAME PLACE.

STOVE-LID.

SPECIFICATION forming part of Letters Patent No. 225,151, dated March 2, 1880.

Application filed July 28, 1879.

*To all whom it may concern:*

Be it known that I, JAMES J. LOWDEN, of Hoosick Falls, in the county of Rensselaer and State of New York, have invented a new and useful Improvement in Stove-Lids, which improvement is fully set forth in the following specification and accompanying drawings, in which—

Figure 1 is a top view of a stove-top with my invention attached. Fig. 2 is a plan view of my lid with the lifter engaged, showing the manner of removing or raising the lid. Fig. 3 is a side view of the same with lifter.

The object of my invention is to provide a stove-lid which is not difficult to make, and which cannot become clogged in the receptacle for the lifter in the same; and the nature of the invention consists in the construction and novel arrangement of parts, as hereinafter shown and described.

In the accompanying drawings, A represents a stove-top; B, the lid, having a marginal notch, E, formed in its edge, and C represents the lifter for removing the lid. The position of the lifter when engaged with the notched edge of the lid is shown at D.

The notch or receptacle E for the lifter is made in the outer edge of the lid, and is made sufficiently wide, but is not deep. It should be beveled somewhat underneath its longer edge to permit the ready insertion of the lifter end, the latter being made with a transverse slot to obtain an edge purchase.

It will be seen from the foregoing that when the stove-lid is in position on the stove, should the edge notch of the lid become clogged with any substance, upon inserting the lifter into said notch the substance will fall into the fire-box of the stove.

Having described my invention, what I claim as new, and desire to secure by Letters Patent, is—

1. The stove-lid B, having a marginal notch, E, in its outer edge, beveled on the under side at said notch, substantially as specified.

2. The combination of the stove-top A, the stove-lid B, the lifter C, and the notch E at the outer edge of said lid, the above parts operating for the purpose of handling and removing the stove-lid and for automatically freeing the notch for the lifter, all substantially as shown and described.

JAMES J. LOWDEN.

Witnesses:
 HENRY O. PETERS,
 JAMES H. LIVINGSTON.